Oct. 22, 1940.   W. E. CARR   2,218,637
FULLERING WHEEL
Filed July 17, 1939
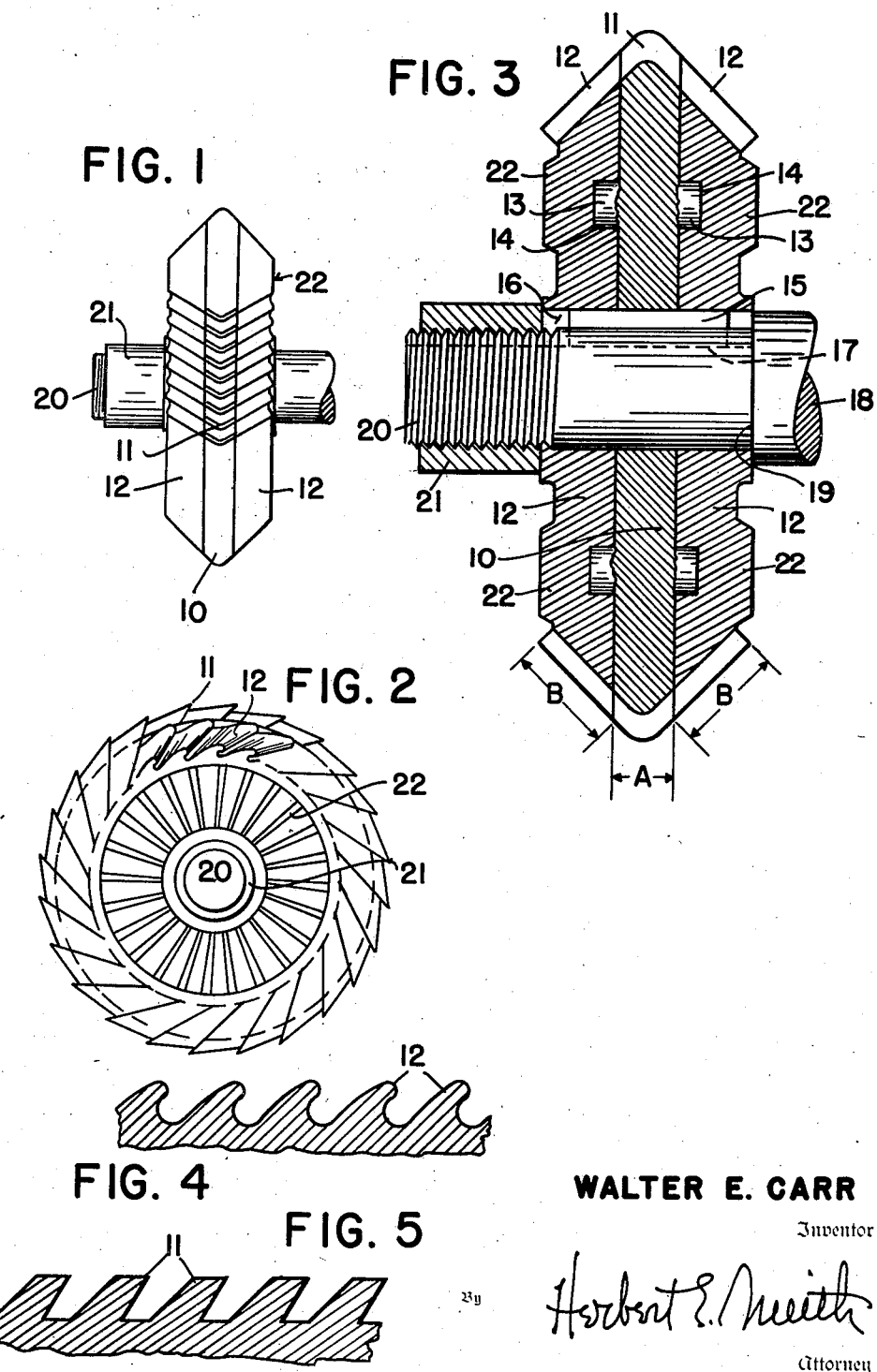
WALTER E. CARR
Inventor Patented Oct. 22, 1940

2,218,637

UNITED STATES PATENT OFFICE 2,218,637

FULLERING WHEEL

Walter E. Carr, Spokane, Wash.

Application July 17, 1939, Serial No. 284,866

6 Claims. (Cl. 76—95)

My present invention relates to fullering wheels for sharpening and re-gauging rock drill bits, mainly of the die-forged variety.

An important object of the invention is to provide a rotating milling and swaging wheel for sharpening rock drill bits when at forging temperatures for the purpose of re-forming the bit to establish the proper form and shape of the cutters and to renew the gauge of the bit after being worn through use.

Another important object is to provide milling cutters on the face of the wheel for forming the clearance grooves of the bit to maintain them of proper dimension to pass the cuttings from the hole, and also to provide on the sides of the milling cutters fullering elements to form the cutters of the bit and swage the cutters outward so that the original gauge may be machined on the bit in a subsequent operation.

Other objects and advantages of the invention will be apparent during the course of the following description.

In the accompanying drawing, forming a part of this specification, and in which like numerals are employed to designate like parts throughout the same, Figure 1 is an end view of my fullering wheel showing the cutter elements and the fullering elements in part only, Figure 2 is a side view of Figure 1, Figure 3 is a modified form of Figure 1 in which the milling section is formed from one disk and the fullering sections on either side thereof are formed separately and secured to the said central or milling element, Figure 4 is a cross section through the area B of Figures 1 and 3 showing the shape of the fullering elements, and Figure 5 is a cross section through the area A of Figures 1 and 3 showing the form of the milling teeth in cross section.

In the drawing, wherein for the purpose of illustration is shown a preferred embodiment of my invention, the numeral 10 indicates the wheel as a whole, which has a V-shaped face, a center milling element 11 and side round-nosed fullering elements 12 positioned on each side of the milling element, these latter elements being beveled to coincide with the angle of slope of the central milling element. The cutting edges of the milling element 11 and of the fullering elements 12 are also formed V-shaped and receding from the initial contact point of the nose of the cutter.

As shown in Figure 1, the fullering wheel may be made from one solid disk, while in Figure 3 the wheel is made up of three formed plates or discs in which the center plate is a milling element 11 having milling cutters on its periphery and formed with a rounded nose. The side or fullering elements 12 are also formed of disks conforming to the V-shape of the face of the wheel and carrying on their peripheries fullering teeth formed and shaped as indicated in Figure 4. The three members making up the wheel are suitably secured together by means of pins, keys or any other form that will hold the several disks in fixed relation. In the present instance, as in Figure 3, I have utilized extending pins 13 supported on the central disc and fitting into sockets 14 formed in the inside faces of the fullering discs, and as an additional precaution have used a key, as 15, supported in a key way 16 in the wheel and in a key way 17 formed in the supporting shaft 18 upon which the wheel is mounted. This shaft may be offset or reduced as at 19 and provided with threads as 20 and a nut 21 for properly mounting and supporting the wheel.

On the outer sides of the fullering elements milling teeth 22 are provided for use in forming the exact diametrical gauge to the drill bit after the face of the wheel has acted upon a bit for the purpose of re-forming and sharpening the same.

The form of fullering wheel herein disclosed is primarily intended for the sharpening and reforming of rock drill bits of the four-point type. Modifications, such as the angle of the V on the face of the bit, will make such a wheel capable of the same work upon bits of six points and, through the use of such a wheel with a flat face, two-point bits may be sharpened and renewed for use.

The wheel is mounted upon a proper mandrel or supporting shaft and the power applied at usual motor speed. A drill bit at forging temperature is then applied to the wheel and against the milling cutter and the fullers to meet the latter at such a point that the V-shaped edge of the cutter correctly fits the V-shaped space between the adjacent cutting edges of the drill bit, in which case the cutters remove a sufficient amount of metal from the drill bit to maintain the proper dimensions to permit the passage of cuttings from the cutting edges of the bit when in use in rock drilling. At the same time the fullering elements engage two adjacent cutters of the drill bit, swaging the metal contacted downward and outward, which operation forms two renewed cutting faces and extends or forms an expanded cutting edge to the cutters contacted. When the first operation thus set forth is effected the drill is rotated one-quarter turn, and two new cutter faces of the bit are presented to the tool. This is continued by two subsequent one-quarter turns until all cutter faces have been contacted, in which state new and sharpened cutting edges have been formed on the cutting teeth, the clearance space comprising the V between the cutting edges has been reestablished for proper clearance of cut material, and the outer points of the teeth have been spread or expanded through the action of the fullering elements so that the bit may now be presented to the miller elements 22 on the sides of the wheel for proper gauging of the tool. In this latter performance the tool is rotated to insure that the gauge will be uniform from the axial center of the bit. Upon subsequent tempering of the bit thus renewed it is ready for drilling purposes at the same and original gauge of the initially forged bit.

In contrast to this manner of sharpening a bit, it is usual to take a worn bit and grind cutting faces thereon. However, such form of sharpening does not re-establish the gauge of the bit and it is necessary to re-gauge the ground bit to a size smaller than the original, and such grinding is usually limited to two times, after which the material has been so used or worn that the bit is too small for any proper drilling purpose. In the use of my fullering wheel I am able to re-sharpen a drill bit several times at the original gauge, several more times at the next reduced gauge, and subsequently other times for smaller gauges.

It is to be understood that the form of my invention, herewith shown and described, is to be taken as a preferred example of the same, and that various changes in shape, size and arrangement of parts may be resorted to without departing from the spirit of my invention or the scope of the subjoined claims.

Having thus fully described my invention, what I claim as new and desire to secure by Letters Patent is:

1. A fullering wheel for drill bits comprising a wheel having a V-shaped face provided with a central milling section and adjoining series of bull-nosed teeth forming outside fullering sections on said face.

2. A fullering wheel for drill bits comprising a wheel having a V-shaped face, milling cutters formed over a central area of said face, and a series of bull-nosed teeth forming fullering sections formed on each side of the milling cutters and in alignment therewith.

3. A fullering wheel for drill bits comprising a wheel having a V-shaped face, V-shaped milling cutters over a central area of the face, and adjoining series of bull-nosed teeth forming fullering elements extending from the cutters and aligned therewith.

4. A fullering wheel for drill bits comprising a wheel having a V-shaped face, V-shaped milling cutters over a central area of the face, a series of bull-nosed teeth forming fullering elements extending from the cutters and aligned therewith, and side cutters carried by said wheel.

5. A fullering wheel for drill bits comprising a wheel formed of interlocking disk sections, said wheel having a central disk section with V-shaped milling cutters on the face of the disk and adjacent disk sections on each side of the central disk section, with a series of bull-nosed teeth forming fullering elements carried on their faces and disposed at an angle corresponding to the angle of the V-shaped milling cutters.

6. A fullering wheel for drill bits comprising a wheel formed of interlocking disk sections, said wheel having a high central disk section with V-shaped milling cutters formed on the face thereof, adjacent disk sections on each side of the central disk section with a series of bull-nosed teeth forming fullering elements carried on the faces of the sections and disposed at an angle to coincide with the angle of the V-shaped milling cutters, said milling cutters and fullering elements disposed at an angle with respect to the axial center of the wheel whereby the milling cutters engage the drill bit in advance of the fullers.

WALTER E. CARR.